April 7, 1959 E. A. MARHEINE 2,881,253

TELEPHONE ANSWERING APPARATUS CONTROL

Filed Oct. 16, 1957

INVENTOR.

EDWARD A. MARHEINE

BY

Andrus, Sceales & Starke

Attorneys

United States Patent Office 2,881,253

Patented Apr. 7, 1959

2,881,253

TELEPHONE ANSWERING APPARATUS CONTROL

Edward A. Marheine, Milwaukee, Wis., assignor to Electronic Secretary Industries, Inc., Waukesha, Wis., a corporation of Wisconsin Application October 16, 1957, Serial No. 690,568

5 Claims. (Cl. 179—6)

Figures 1, 2:
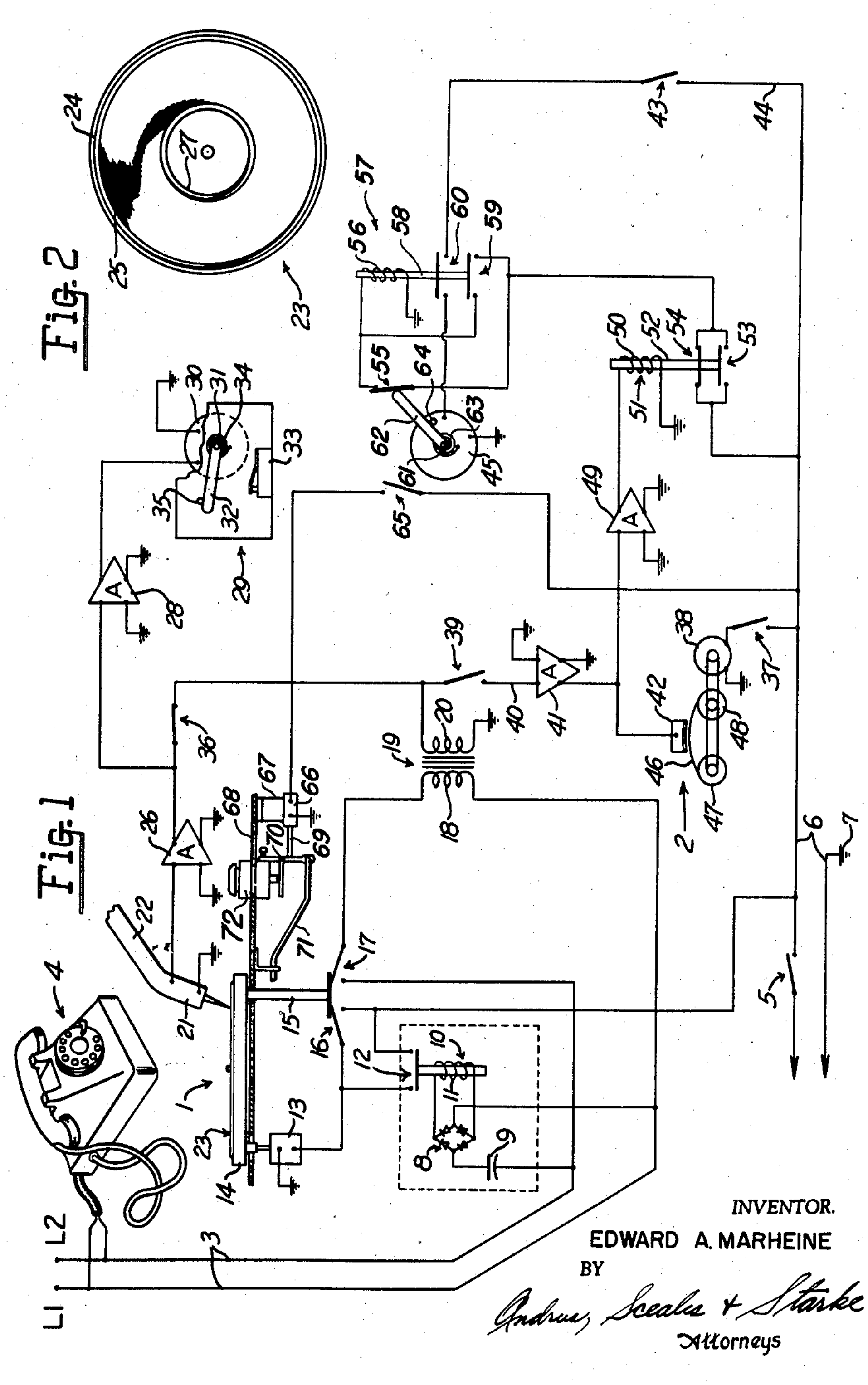

This invention relates to a telephone answering apparatus control and particularly to a control of an incoming signal recording means by the status of the incoming signal.

It is known to employ the incoming voice signals established by the message of the calling party to start and maintain a message recording device. If the calling party remains silent for a predetermined period and thereby discontinues the voice signals, the answering device returns to standby. Similarly, if the calling party hangs up, the answering device normally returns to standby.

However, in certain telephone systems, a dial tone is established in the telephone line circuit when the calling party hangs up and the called party's telephone apparatus is still operatively connected to the line. In such a system, the automatic voice controlled recorder of known devices receives the dial tone signal and is latched in circuit. The continued operation interferes with the operation of the telephone line circuit generally and prevents subsequent incoming calls to the subscriber employing the answering apparatus.

A satisfactory operating control to avoid this and similar forms of latching is disclosed in the copending application of Joseph J. Zimmerman, Serial No. 645,130, which was filed on March 11, 1957, and assigned to a common assignee with this application. As disclosed therein, a relay or similar electrically operated device is controlled by the incoming voice signals. The relay controls two sets of contacts which are alternately oppositely opened and closed in the presence of continuous silence or a continuous tone. The contacts are connected in parallel to actuate a timing circuit which will disconnect the answering apparatus after a predetermined period of silence or of continuous tone.

The present invention is directed to a timing circuit under the control of a similar electrically operated device and provides a simple, reliable circuit therefor.

In accordance with the present invention, a timing device is biased to a normally inactive position. The timing circuit is connected to the voice controlled relay to be actuated during the presence or the absence of a signal to maintain operation of the timing device. Once the timing device starts, a latch circuit is established to maintain operation thereof until a change in the position of the relay contact occurs. A switch, normally held closed by the inoperative timing device, opens incident to the initial movement of the timing device and prevents re-energization of the timing control circuit unless the timing device is reset to an initial position.

The drawing illustrates the best mode presently contemplated by the inventor of carrying out the invention as described hereinafter.

In the drawing:

Figure 1 is a schematic circuit of automatic telephone apparatus employing the present invention; and Fig. 2 is a plan view of an outgoing message record employed in the embodiment of Fig. 1.

Referring to the drawing and particularly to Fig. 1, a reproducing phonograph 1 and a recorder 2 are coupled to incoming telephone lines 3 to automatically answer an incoming telephone call to a telephone 4 shown as a conventional desk type variety. A main switch 5 is connected in a set of power supply lines 6 for the various components of the apparatus and permits operative disconnection of the phonograph and the recorder if the telephone subscriber is present and wishes to personally answer the phone.

The power supply lines 6 are connected to any suitable source of alternating current, not shown, such as the conventional 110 volt source. The one supply line is shown grounded as at 7. The various electrical components which are connected to the power supply lines 6 are shown as having one grounded terminal and another terminal connected to the non-grounded or hot power supply line 6 to complete each corresponding energizing circuit.

To initiate actuation of the device, a full wave rectifier 8 is connected in series with a capacitor 9 across the telephone lines 3 to establish a triggering circuit responsive to ringing currents. The capacitor 9 blocks the direct current normally circulating in the telephone line circuit from the rectifier 8. However, the capacitor 9 allows the intermittent ringing currents to pass. The rectifier 8 converts the ringing currents to a direct current which operates a triggering relay 10 which includes a winding 11 connected across the output of the rectifier 8 and controlling a set of normally open contacts 12. The contacts 12 are serially connected with a motor 13 of the phonograph 1 to the hot power line 6. The incoming ringing currents energize the relay 10 to periodically close the contacts 12 and pulse the motor 13.

Each time the contacts 12 close, the motor 13 is energized and drives a turntable 14 of the phonograph 1 through a suitable turntable mechanism, not shown. The turntable mechanism may be of any suitable variety such as described in U.S. Patent No. 2,394,539, issued to J. Erwood on February 12, 1946.

A retractible pin 15, which constitutes part of a clutch device described in the referred to patent, is employed in the illustrated embodiment of the invention as a means for actuating two low pressure switches 16 and 17. The retractible pin is adapted to hold the switches 16 and 17 closed when the pin 15 is in a depressed position and to allow the switches to open when the retractible pin is in its normally elevated position. In this manner, the periodic closing of the triggering contacts 12, which actuates the phonograph motor 13 and thus the turntable mechanism, operates to eventually close the switches 16 and 17.

Switch 16 is connected in parallel with the triggering contacts 12 to bypass the triggering contacts and lock or latch the phonograph motor 13 to power supply lines 6. Consequently, once switch 16 closes, the phonograph motor 13 continues to drive the phonograph turntable 14 until the pin 15 is retracted, as hereinafter described.

Switch 17, which is also actuated by pin 15, is connected in a series circuit with a line winding 18 across the telephone lines 3. The winding 18 is one winding of a coupling transformer 19 and corresponds to the conventional load winding, not shown, of the telephone 4. A second winding 20 is magnetically coupled to the winding 18 and is connected to a phonograph pickup 21 through a tone arm 22.

The phonograph pickup 21 is adapted to traverse a record 23 carried by the turntable 14 and establish electrical signals in accordance with the sound recorded on the record 23. As shown in Fig. 2, the record is a conventional disk type having a continuous spiral sound groove starting with an initial lead-in groove 24. The length of the lead-in groove 24 is such that the period taken for the pickup 21 to traverse the groove 24 generally corresponds to the time delay to completely depress the pin 15 to actuate switches 16 and 17. Therefore, the pickup 21 does not reach an operating record zone 25 which contains an outgoing message until the switches 16 and 17 are closed. The zone 25 constitutes an outgoing message portion which is converted to a train of corresponding electrical signals. An amplifier 26 has its input connected to the tone arm 22 and its output connected to the winding 20 of transformer 19 to suitably amplify the signals for transmission via the telephone lines 3. The message is thus transmitted via the coupling transformer 19 to the telephone lines 3 and then to the calling party as the pickup 21 traverse the grooves in the message portion 25. The pickup 21 then enters an endless groove 27 which immediately follows the message portion 25. The groove 27 contains a continuous tone signal. This tone signal is also amplified by amplifier 26 and transmitted to the calling party via the transformer 19. The signal from the pickup 21 and amplifier 26 is also transmitted through an amplifier 28 to a timer switch 29. After a predetermined period of continuous energization, the timer switch 29 is adapted to operatively disconnect the phonograph 1 from the transformer 19 and to operatively connect the recorder 2 to the transformer 19.

The timer switch 29 includes a synchronous motor 30 which is connected by a drive shaft 31 to a switch arm 32. The motor 30 is adapted to drive the arm 32 toward a bank of switches 33. A coil spring 34 encircles the drive shaft 31 with the one end of coil spring 34 connected to arm 32 and the opposite end connected to the motor 30. The coil spring 34 continuously biases the arm 32 to an initial starting position engaging a stop pin 35. Incoming intermittent signals to motor 30 from the pickup 21, momentarily drive the arm 32 toward switches 33. However, between the signals the coil spring 34 resets the arm 32 to its initial position engaging pin 35. Therefore, during the outgoing message portion on record 23, the arm 32 is never driven sufficiently far to actuate the switches 33. However, when the pickup 21 rides in the endless groove 27, the electrical signal which is established by the continuous tone, continues to actuate the motor 30 to drive the arm 32 and after a predetermined period the arm actuates the switches 33.

A first switch 36 of the bank of switches 33 is connected in the line which connects the output of amplifier 26 to the input transformer winding 20. This switch 36 is normally closed to allow the previously described transmission of the outgoing message portion 25 on record 23. When the switch 36 is actuated, it opens and eliminates further transmission of the continuous sound recorded on the record 23 which may be used as a signal to inform the calling party that he may now give an incoming message if he so wishes. Switch 36 is connected in circuit beyond the connection of the input of amplifier 28 to the output of amplifier 26. The electrical signal established by the groove 27 then continues to energize the timer 29 even after the switch 36 is opened.

A second switch 37 of switch bank 33 is serially connected with a drive motor 38 for the recorder 2 across A.C. supply lines 6. The switch 37 is normally open and prevents operation of the recorder 2 during the transmission of the outgoing message portion 25. When the bank of switches 33 is actuated by arm 32, the switch 37 closes and energizes the recorder motor 38.

A third switch 39 of switch bank 33 is connected in a line 40 which connects the winding 20 to the input of an amplifier 41. A recording head 42 of recorder 2 is connected to the output of the amplifier 41. When switch 39 closes, it operatively connects the recording head to the telephone lines 3 via the coupling transformer 19.

A fourth switch 43 of bank 32 is connected in a control line 44 which connects a disconnect motor 45 to the power supply lines 6. As hereinafter described, the disconnect motor 45 operates to return the automatic answering apparatus to standby if a message signal is not received from the calling party within a predetermined time period.

If a message is received, the recording head magnetically establishes the message upon a record 46. Record 46 is a wire or tape which is initially wound on a spool 47. The tape 46 is unwound from the initial record reel and wound upon another reel 48 and in so doing, passes the recording head 42. The spools 47 and 48 are coupled to recorder motor 38 and driven thereby when the switch 37 is closed, as previously described.

The incoming sound signals passing through the amplifier 41 are connected to the input of a triggering amplifier 49 as well as to the recording head 42. A relay winding 50 of a relay 51 is connected to the output of the triggering amplifier 49. The relay winding 50 actuates a common armature 52 controlling a first set of normally open contacts 53 and a second set of normally closed contacts 54. As long as winding 50 is de-energized, contacts 53 are open and contacts 54 are closed. As long as winding 50 is energized, contacts 53 are closed and contacts 54 are open. The contacts 53 and 54 are constructed and arranged such that there is a momentary period when both sets of the contacts 53 and 54 are open during a change in the energized state of winding 50.

The contacts 53 and 54 are connected in parallel with each other in series with a motor operated switch 55 and a winding 56 of a control relay 57. When the motor operated switch 55 is closed, one of the sets of contacts 53 or 54, depending which set is closed, connects the winding 56 to the power line 6 in an energizing circuit independently of the other set of contacts. The energizing of winding 56 establishes a magnetic field which moves the cooperating armature 58 to close two sets of normally open contacts 59 and 60.

The contacts 59 are connected in parallel with switch 55 to maintain winding 56 energized independently of switch 55 after initial energization of the winding. The winding 56 then remains energized until the armature 52 of relay 51 reverses the circuit position of the associated contacts 53 and 54 to momentarily open the energizing circuit to winding 56.

The relay contacts 60 are serially connected with the mid-cycle shift switch 43 and the timer disconnect motor 45 to the power line 6.

Motor 45 is preferably of a synchronous variety and is connected by a drive shaft 61 to a switch arm 62 and is adapted to drive the arm 62 in a counterclockwise direction, as viewed in Fig. 1. A coil spring 63 encircles the motor drive shaft 61 and has one end connected to the arm 62 and the opposite end connected to the motor casing. The coil spring 63 biases the arm 62 to an initial position engaging a stop 64 which is secured to the motor casing. Whenever the motor 45 is de-energized, the coil spring 63 rapidly snaps the arm 62 back to stop 64. The arm 62 in its initial starting position, in engagement with stop 64, holds the switch 55 closed and allows completion of the circuit to the relay winding 56 and resultant energization of the motor. The motor 45 then drives the arm 62 away from switch 55 and toward a disconnect switch 65 mounted in spaced relation to stop 64.

Switch 65 is a normally open switch which is adapted to be closed by arm 62 after a predetermined period of operation of motor 45. The disconnect switch 65 is serially connected with a disconnect solenoid 66 across the power lines 6 to control energization of solenoid 66.

The solenoid 66 is mounted on a bracket 67 which depends from a phonograph turntable support 68. The solenoid 66 is adapted to reset the phonograph 1 to standby through a suitable reject mechanism, not shown. The reject mechanism may be of any suitable variety such as described in the previously referred to U.S. Patent No. 2,394,539 to J. Erwood. An armature 69 of solenoid 66 is connected to a depending pivotal member 70 which constitutes a part of the reject mechanism in the Erwood patent and which is supported by the phonograph platform 68. A reciprocable reject rod 71 is secured to the free end of member 70 and is connected to the automatic reject mechanism, not shown, as set forth in the referred to patent to Erwood. Energization of solenoid 66 actuates the reject rod 71 in the same manner as manual depressing a reject button 72, as shown in the Erwood patent. The reject mechanism is interconnected with the turntable mechanism, not shown, and simultaneously resets the tone arm 22 to an original starting position and retracts the depressed pin 15 to open the associated switches 16 and 17.

The operation of the illustrated embodiment of the invention is described as follows.

Assume the main control switch 5 is closed and an incoming call is received. The incoming ringing currents pulse triggering contacts 12 of relay 10. When the contacts 12 close, the motor 13 drives the turntable through a suitable turntable mechanism. Each time the motor 13 is driven, the pin 15 is depressed toward the switches 16 and 17. After several ringing periods the pin 15 engages and closes switches 16 and 17. Switch 16 bypasses the triggering contacts 12 and latches the phonograph motor 13 to the power line 6. The phonograph 1 then continues normal operation with the phonograph pickup 21 finally engaging the endless groove 27. The phonograph 1 then continues to operate until the disconnect solenoid 66 is energized.

Switch 17 which is closed by pin 15 connects the coupling transformer winding 18 to the telephone line and first permits transmission of the previously recorded message 25. The recorded message may be of any suitable information, such as informing the calling party that he is connected to an automatic answering device and that at the end of a subsequently given tone signal he may transmit any message he may desire and that it will be recorded.

After the pickup 21 traverses the outgoing message portion 25 and transmits the outgoing message, the pickup 21 engages the endless groove 27 and establishes a continuous electrical tone signal.

This signal is momentarily transmitted to the calling party to inform him that the apparatus is in condition for recording. This continuous signal also drives the timer switch 29 to actuate the switch bank 33 containing switches 36, 37, 39 and 43.

Switch 36 opens and disconnects the phonograph pickup 21 from the telephone lines 3 and discontinues the transmission of the tone signal.

Switch 37 closes and energizes motor 38 which then drives the record spools 47 and 48 to transfer the record 46 from the one reel to the other and past the recording head 42.

Switch 39 closes and connects the recording head 42 to the coupling transformer winding 20 and allows transmission of incoming message signals to the head 42 which establishes the signals on the record 46 in the form of time-spaced modulated magnetic areas or zones. The winding 20 is also connected by switch 39 to the amplifier 49 and then to the relay winding 50 of the timer relay 51 to impress the incoming signals upon the winding 50.

The fourth switch 43 in switch bank 33 closes and permits the energization of the disconnect motor 45 through the following circuit: Supply line 6, line 44, switch 43, normally open contacts 60 of relay 57 and motor 45 to ground.

The operation of motor 45 is subsequently controlled by the relay 57 which is in turn controlled by the switch 55 and the timer relay 51.

With the interlock switch 55 held closed by the arm 62, the relay winding 56 is energized either by contacts 53 or 54 depending upon the presence or the absence of an incoming signal. The contacts 59 and 60 then close. Contacts 59 latch the relay winding 56 to power lines 6 via the econtacts 53 or 54. The timing motor 45 starts a cycle of operation due to closing of contacts 60 and moves the arm 62 towards switch 65 to effect disconnect and resetting of the apparatus to standby after a predetermined continuous period of timer energization.

However, if a message is being transmitted to the recorder 2, the sound appears as a series of pulses separated by momentary periods of silence. The contacts 53 and 54 then change from their normally closed and opened position with each pulse and for the duration of the pulse. In moving from one position to the other, momentarily neither of the contacts 53 and 54 are closed. Consequently, the latch circuit to the relay winding 56 via the contacts 59 is broken and the relay winding 56 is deenergized. The contacts 59 and 60 then open and the timer motor 45 is reset by the spring 61 to an initial starting position with the arm 62 engaging stop 64. When the arm 62 engages the stop 64, the switch 55 is again closed to allow energization of winding 56 therethrough via the control contacts 53 or 54.

Thus, it is seen that winding 56 cannot be again energized after initial energization of winding 56 and resultant movement of arm 62 unless the arm 62 is returned to its initial starting position engaging stop 64 to close switch 55. Therefore, movement of the arm 62 cannot be made cumulative during successive cycles of the energization of winding 56 and a complete timing period, comprised of silence or a continuous signal, is required to effect a disconnect of the device.

However, if the calling party fails to give a message for a predetermined period, the timer motor 45 continues to operate and rotates the arm 62 against the bias of spring 63 and away from stop 64. This is true because the latch contacts 59 now maintain winding 56 energized to complete the power circuit to motor 45 via contacts 60.

Similarly, if the calling party hangs up and a dial tone is established thereby in the telephone line circuit, the continuous tone actuates the relay 51 and maintains energization of the winding 56. The arm 62 then moves toward switch 65 and if the motor is not de-energized within a predetermined time period corresponding to the time taken for the arm 62 to traverse the arc between stop 64 and switch 65, the switch 65 is closed and completes the energizing connection to the disconnect solenoid 66. Solenoid 66 then retracts the associated armature 69 and actuates the reject rod 71.

A latch, not shown, is released by actuation of the reject rod 71 and the tone arm 22 is reset to an initial position adjacent the outer periphery of record 23, as set forth in the previously referred to patent of J. Erwood. Simultaneously with the movement of the tone arm 22, the pin 15 is elevated and the switches 16 and 17 open through the turntable mechanism, not shown. Switch 16 disconnects the motor 13 from the power line 6 and resets the phonograph 1 to standby. Switch 17 breaks the circuit connecting winding 18 across the telephone lines and returns the apparatus to standby.

The various amplifiers are provided with suitable power supplies, not shown, which may be turned on in response to actuation of master switch 5 or automatically in response to some portion of the answering cycle. Acoustical or inductive connections of the automatic apparatus can be employed as well as the illustrative conductive connections. Further, it may be connected directly to the telephone line as shown or connected through the telephone instrument as an intermediary.

The present invention provides a simple and positive means for control of an indeterminant cycle of recording for automatic telephone answering apparatus and similar apparatus.

Various modes of carrying out the invention are contemplated as being within the scope of the following claims particularly pointing out and distinctly claiming the subject matter which is regarded as the invention.

I claim:

1. Telephone answering apparatus adapted to answer an incoming call in response to a received ringing current over a ringing circuit and including a recorder to record an incoming message of indeterminate length, which comprises a resettable timing means adapted to return the apparatus to standby after a predetermined period of timing means operation, an energizing circuit for said timing means and operatively controlled by the ringing circuit, an enabling circuit under the control of the signals transmitted to the recorder to complete said energizing circuit in the presence and in the absence of an incoming signal to the recorder, said enabling circuit including circuit controlling means responsive to a change in the state of the incoming signal between conducting and non-conducting to momentarily open said enabling circuit, and normally open disenabling means operatively controlled by said timing means to close with the timing means in completely reset position and to open with the initial energization of the timing means and connected in said enabling circuit in series with said controlling means to prevent operation of the enabling means until said timing means is reset to an initial position.

2. Telephone answering apparatus adapted to answer an incoming call in response to a received ringing current over a ringing circuit and including a recorder to record an incoming message of indeterminate length, which comprises a resettable timing means adapted to return the apparatus to standby after a predetermined period of timing means operation, an energizing circuit for said timing means and operatively controlled by the ringing circuit, an enabling circuit under the control of the signals transmitted to the recorder to complete said energizing circuit in the presence and in the absence of an incoming signal to the recorder, said enabling circuit including circuit controlling means responsive to a change in the state of the incoming signal between conducting and non-conducting to momentarily open said enabling circuit, and a switch serially connected in said enabling circuit and biased to open position, said switch being operatively associated with said timing means and held in a closed position with said timing means in an initial starting positon.

3. Telephone answering apparatus adapted to answer an incoming call in response to a received ringing current over a ringing circuit and including a recorder to record an incoming message of indeterminate length, which comprises a resettable timing means adapted to return the apparatus to standby after a predetermined period of timing means operation, an energizing circuit for said timing means and operatively controlled by the ringing circuit, an enabling circuit including an electro-responsive means having timer switching means moving from a first circuit position to a second circuit position with a momentary third circuit position therebetween, said first and second circuit positions effecting the same conducting state in said enabling circuit and said third circuit position effecting an opposite conducting state, an electro-responsive controller having an electrically responsive operator connected in said enabling circuit to selectively complete said energizing circuit and biased to normally open said energizing circuit, a disenabling switch operatively actuated by said timing means and serially connected to a power source with said switching means and said operator to open the circuit through the disenabling switch to said controller in response to movement of the timing means from an initial stop position, and a latch circuit serially including said switch means to maintain operation of the controller independently of the disenabling switch and under the control of the timer switching means after initial energization of the controller via said disenabling switch until a subsequent change in the conducting state of the incoming signal.

4. Telephone answering apparatus adapted to answer an incoming call in response to a received ringing current over a ringing circuit and including a recorder to record an incoming message of indeterminate length, which comprises a resettable timing means adapted to return the apparatus to standby after a predetermined period of timing means operation, an energizing circuit for said timing means and operatively controlled by the ringing circuit, an electrically operated switch having parallel first circuit closing means and second circuit closing position corresponding to the presence of a signal to the recorder and to the absence of a signal to the recorder, said switch momentarily assuming a circuit opening position in changing between said first and second circuit closing positions, a disenabling switch biased to a normally circuit opening position and operatively associated with the timing means to be held in a circuit closing position with the timing means in an initial starting position, an electro-responsive switching means having a winding serially connected with said disenabling switch and with said paralleled switching means and having normally open contact means in said timer circuit and having normally open contact means in parallel with said disenabling switch.

5. Telephone answering apparatus adapted to answer an incoming call in response to a received ringing current over a ringing circuit and including a recorder to record an incoming message of indeterminate length, which comprises a resettable timing means having a member movable from an initial starting position and adapted to return the apparatus to standby after a predetermined period of continuous movement of said member, an energizing circuit controlling said timing means and operatively controlled by the ringing circuit, a relay having a winding connected to the recorder input to receive incoming alternating current signals and having a first set of contacts closed with the winding energized and a second set of contacts closed with the winding de-energized by a common pole member whereby neither set of contacts is closed as the energization state of said winding changes, a switch biased to an open position and held closed by said timing member in the initial starting position, a relay having a winding serially connected with said switch and with said first and second sets of contacts connected in parallel, said relay having first contacts serially connected in said timer circuit and second contacts connected across said disenabling switch whereby if said relay is de-energized the said relay cannot be again energized until said timing member is reset to the initial starting position.

No references cited.